May 22, 1934.     J. BUGATTI     1,959,704
SUSPENSION OF RAILWAY CARS AND OTHER VEHICLES
Filed Dec. 7, 1932     4 Sheets-Sheet 1
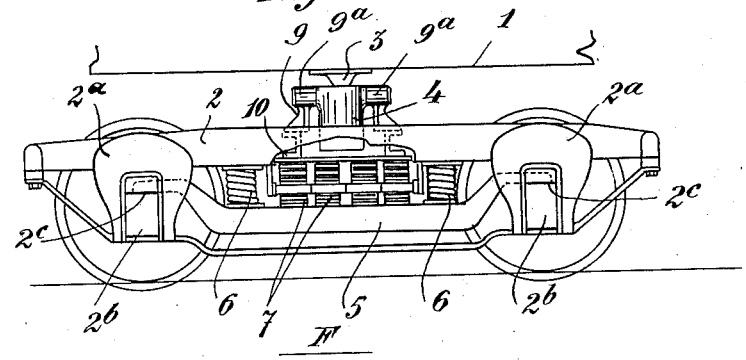
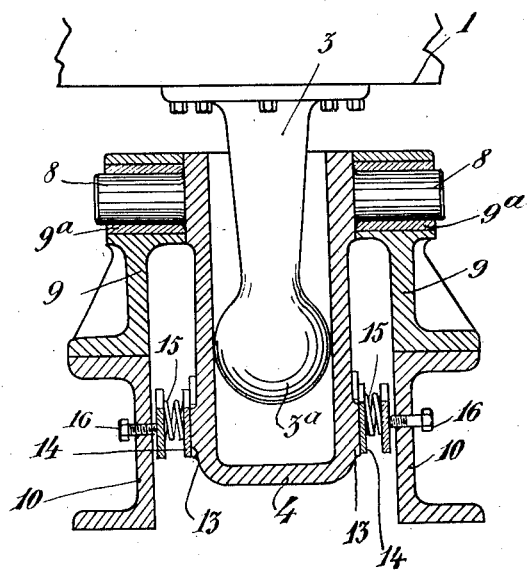
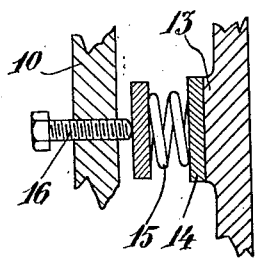
Inventor:
Jean Bugatti,
by Mauro & Lewis,
attorneys.

May 22, 1934.   J. BUGATTI   1,959,704
SUSPENSION OF RAILWAY CARS AND OTHER VEHICLES
Filed Dec. 7, 1932   4 Sheets-Sheet 2
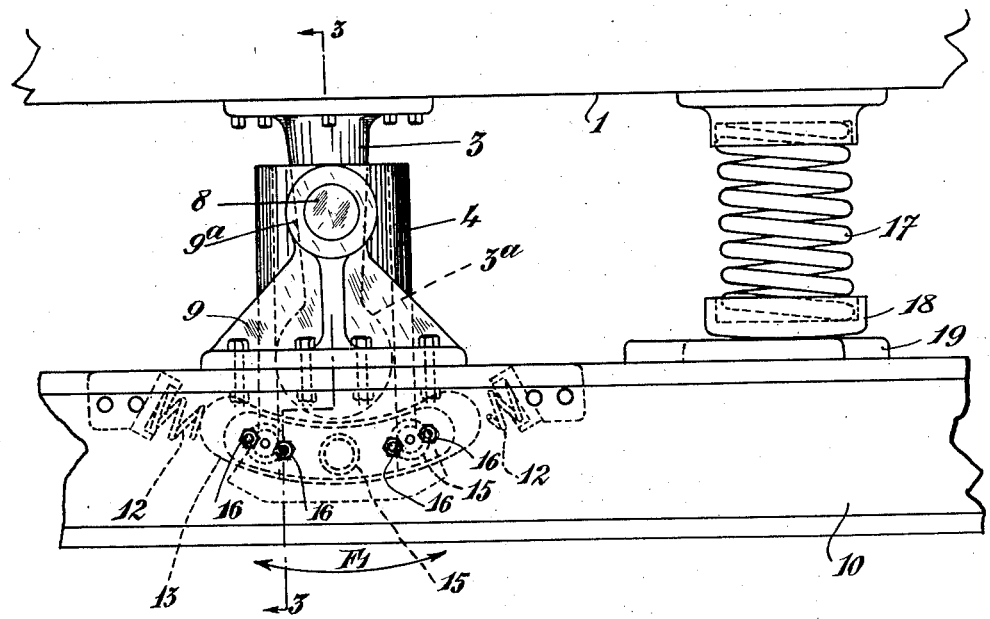
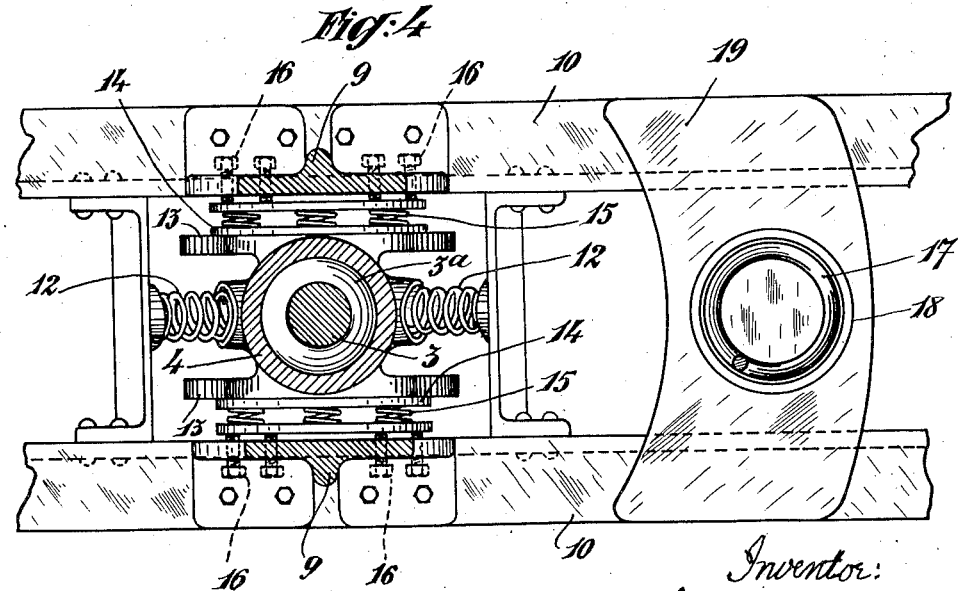
Inventor:
Jean Bugatti,
by Mauro & Lewis,
Attorneys.

May 22, 1934.  J. BUGATTI  1,959,704
SUSPENSION OF RAILWAY CARS AND OTHER VEHICLES
Filed Dec. 7, 1932  4 Sheets-Sheet 3
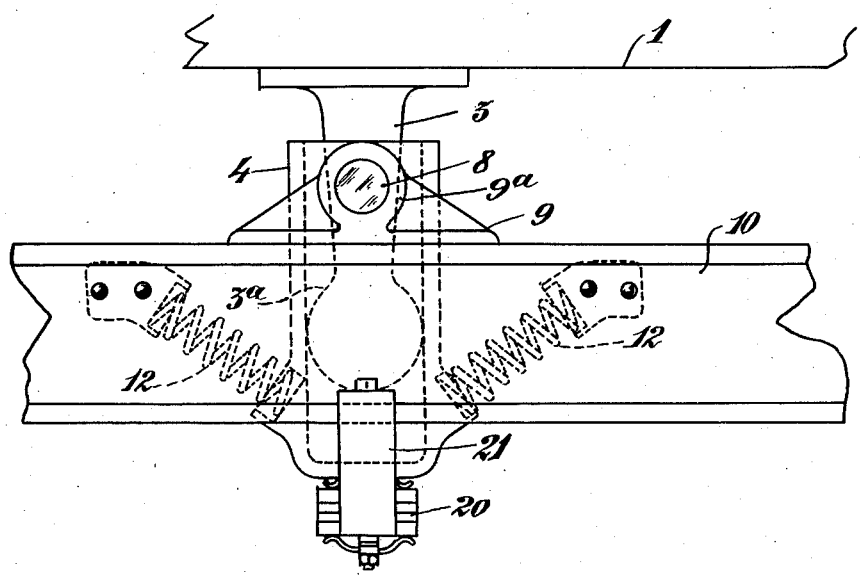
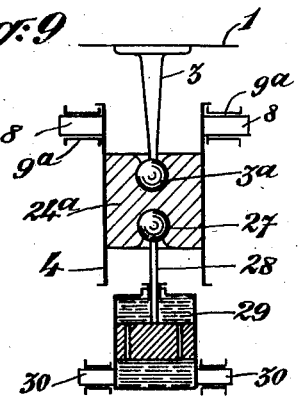
Inventor:
Jean Bugatti,
by Mauro & Lewis,
attorneys.

May 22, 1934.   J. BUGATTI   1,959,704
SUSPENSION OF RAILWAY CARS AND OTHER VEHICLES
Filed Dec. 7, 1932   4 Sheets-Sheet 4
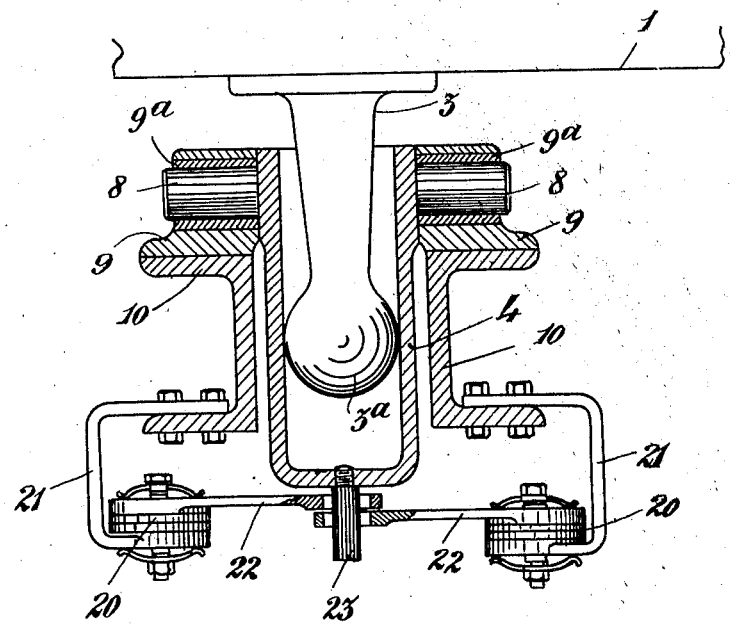
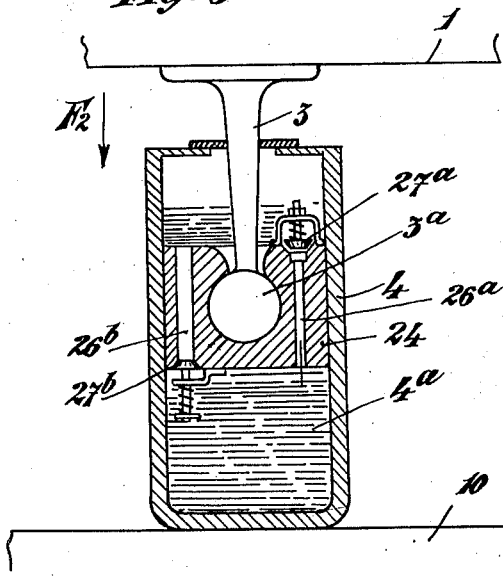
Inventor:
Jean Bugatti,
by Mauro & Lewis,
attorneys Patented May 22, 1934

1,959,704

UNITED STATES PATENT OFFICE 1,959,704

SUSPENSION OF RAILWAY CARS AND OTHER VEHICLES

Jean Bugatti, Molsheim, France

Application December 7, 1932, Serial No. 646,191
In France December 8, 1931

10 Claims. (Cl. 105—193)

The present invention has for its object a suspension device for vehicles and chiefly for railway cars or locomotives. The essential characteristic of the device according to my invention is that, between the unsuspended part (axle or truck) and the suspended part (car body and its frame) there is provided a connecting system which ensures the braking and the deadening of the relative displacements between said parts in the transversal direction and eventually in the vertical direction. Said suspension device ensures a perfect stability of the vehicle even in the case of the railroad track being defective. As a matter of fact, it will readily be understood that in the case of a lateral shock or of a sudden displacement of the unsuspended part of the vehicle, the body or suspended part, the weight of which is considerably greater than that of the unsuspended part, can remain unmoved, so that the passengers are no longer disturbed by the shocks or the swaying motions that take place continually with the rolling stock now in use.

According to an embodiment of my invention, the truck bolster supports the pivot or bolt of the car body through the intermediary of an oscillating tube placed between two friction plates which serve to limit its oscillations. Said oscillating tube may also act on the arms of a simple or double friction shock absorber, the intensity of the friction thus developed being preferably adjustable.

In another embodiment of my invention, the displacements in the vertical direction are limited through the medium of a dash-pot or any other hydraulic shock absorber on which the pivot carried by the vehicle body or suspended part is caused to act. Said dash-pot may be either of the single acting or of the double acting type, and may be utilized either alone or in combination with the frictional shock absorber so as to ensure the braking of the transversal and vertical relative displacements of the car body with respect to the truck or to the axle.

Preferred embodiments of my invention will be herinafter described with reference to the accompanying drawings, given merely by way of example, and in which:

Fig. 1 is a general diagrammatical view of a railway truck provided with the transversal shock absorbing device according to my invention;

Fig. 2 is a front view at an enlarged scale showing how the above mentioned device may be carried out according to my invention;

Fig. 3 is a sectional view on the line 3—3 of Fig. 2;

Fig. 4 is a plan view of the device shown in Fig. 2, a part of the device being shown in sectional view;

Fig. 5 is a view showing, at an enlarged scale, a detail of the device shown in Fig. 3;

Figs. 6 and 7 are a front view and a transverse sectional view respectively of another embodiment of the device according to my invention;

Figs. 8 and 9 are diagrammatic sectional views illustrating other embodiments of the device according to my invention.

In the embodiment shown in Figs. 1 to 5, the body 1 of the railway car is connected to each of the trucks through a kingbolt 3 provided with a ball 3a and which plays the part of a pintle. The spherical portion 3a of kingbolt 3 freely engages a tube or cylinder 4 which replaces the ordinary truck center-casting and is pivoted or swivelled on the truck bolster 10. The truck comprises, as usual, side-frames 2 made integral with axle guards 2a in which the axle boxes 2b are adapted to slide vertically. The side-frames are connected through springs 6 with the equalizers or longitudinal pieces 5 the extremities of which bear on flat supporting surfaces 2c provided on the axle boxes. Side-frames 2 support, through the medium of elliptic springs 7, truck bolster 10. A frame 9 (Fig. 3) comprising bearings 9a in which are journalled trunnions 8 integral with tube 4 is fixed to said bolster 10, so that said tube 4 can oscillate transversally with respect to the truck.

Said journals or trunnions 8 are disposed in parallel relation with the longitudinal axis of the car, so that they form a positive connection between the body and the truck for any displacement in a direction parallel to that of arrows F that is in a direction parallel to that of the track; but they allow relative displacements between said body and said truck in a transverse direction (as shown by arrow F', in Fig. 2).

Said transversal displacements are braked by a friction device which plays the same part as suspension shock absorbers in automobile vehicles. For this purpose, cylinder 4 is provided with plane surfaces 13 against which plates or shoes 14 are strongly applied by springs 15. The strength of said springs can be adjusted by means of screws 16 so as to vary the intensity of the friction.

Lateral springs 12 elastically maintain tube 4 in the longitudinal middle plane of the car body and of the truck.

The car body is supported by the truck through the medium of any suspension device such as spiral springs 17 disposed on either part of cylinder 4. In the example shown in Figs. 2 and 4, said springs are rigidly fixed to the body 1 of the car and they are provided at their lower end with a head 18 which is adapted to slide, when the truck is being rotated with respect to the car body, on a track 19 secured to the elements of bolster 10.

That elastic connection between the car body and the truck could be made in any other suitable manner and it may be advantageous to make it according to the arrangement described in my French Patent No. 726,943 filed November 26, 1931 for "Improvements in trucks for railroad vehicles".

According to another embodiment of my invention, which is illustrated in Figs. 6 and 7, the braking of the oscillations of cylinder 4 is obtained through two shock absorbers 20 of the "friction plates or disks" type. One branch 21 of said shock absorbers is secured to piece 10, and the other branch 22 is connected with a pivot 23 integral with cylinder 4.

My invention further comprises a device for deadening the shocks in the vertical direction which may be used either alone or in combination with the device for braking the relative transverse displacements of the car body with respect to the truck. The device above referred to is illustrated by Figs. 8 and 9.

In the embodiment shown in Fig. 8, the shock absorbing device consists of a dash pot. Cylinder 4 is rigidly fixed to bolster 10 and contains a liquid 4a. The ball 3a of kingbolt 3 is fitted in a socket provided in a cylindrical piece 24 which plays the part of a piston in cylinder 4.

Two conduits 26a and 26b are provided in said piston and are fitted with valves 27a and 27b respectively. Conduit 26a, which is of calibrated cross section, brakes the upward flow of the liquid that is driven out from the space under the piston when the body tends to move down (arrow F²), which absorbs the shocks in the vertical direction. The return of the fluid into the space under the piston takes place through conduit 26b. It will readily be understood that a dash pot similar to that of Fig. 8, but of the double acting type could easily be provided, such an arrangement serving to brake the vertical relative displacements of the car body and of the truck as well in the upward direction as in the downward direction. Finally, said dash pot, either of the simple acting or of the double acting type, could be combined with the frictional shock absorber above described.

Fig. 9 shows in a diagrammatic manner an arrangement of that kind in which piston 24a maintains the ball 3a of the kingbolt that connects the truck with the body and furthermore another ball 27 carried by the rod 28 of the double acting dash pot 29. The cylinder of dash pot 29 is pivoted at 30 so as to turn through an angle corresponding to the oscillation of cylinder 4.

It should be well understood that, in the foregoing description the means for braking the oscillatory motion of cylinder 4 have been indicated by way of example. Any other device capable of braking said oscillatory displacements of cylinder 4 or of the movable organ that plays the part of said cylinder could be utilized according to my invention. Furthermore, although the examples that have been described relate to the case of a railway car mounted on trucks, my invention could as well be applied to the case of a car mounted directly on axles, in which case the transversal braking device and eventually the vertical braking device would be inserted between the body and the axle. In a general manner I do not wish to be limited to the specific examples given in the foregoing description, as there might be changes made in the arrangement, disposition and form of the parts without departing from the principle of my invention as comprehended within the scope of the appended claims.

What I claim is:

1. In a vehicle including a suspended part and an unsuspended part, a device for connecting said suspended part to said unsuspended part, which comprises in combination, a cylinder adapted to move transversely in the unsuspended part but positively connected thereto in the longitudinal direction, a kingbolt rigidly fixed to the suspended part, a ball at the end of said kingbolt adapted to freely engage in said cylinder, and means for braking the transverse displacements of said cylinder with respect to said unsuspended part.

2. In a vehicle including a suspended part and an unsuspended part, a device for connecting said suspended part to said unsuspended part, which comprises in combination, a cylinder at right angles to the longitudinal axis of said vehicle pivoted to the unsuspended part about an axis parallel to the longitudinal axis of said vehicle a kingbolt rigidly fixed to the suspended part, a ball at the end of said kingbolt adapted to freely engage in said cylinder, and means for braking the oscillations of said cylinder.

3. In a vehicle including a suspended part and an unsuspended part, a device for connecting said suspended part to said unsuspended part, which comprises in combination, a cylinder at right angles to the longitudinal axis of said vehicle pivoted to the unsuspended part about an axis parallel to the longitudinal axis of the vehicle, a kingbolt rigidly fixed to the suspended part, a ball at the end of said kingbolt adapted to freely engage in said cylinder, elastic means for normally maintaining said cylinder in a substantially vertical position, and means for braking the oscillations of said cylinder.

4. A device according to claim 3 in which the outer portion of said cylinder is provided with flat surfaces at right angles to the longitudinal axis of the vehicle, the means for braking the oscillations of said cylinder consisting of shoes in contact with said flat surfaces, springs connected with the unsuspended part for applying said shoes against said flat surfaces, and means for adjusting the tension of said springs.

5. A device according to claim 3 in which the means for braking the oscillations of said cylinder consist of shock absorbers of the so-called "disc type" connected on the one hand with said cylinder, and on the other hand with said unsuspended part.

6. In a vehicle including a suspended part and an unsuspended part, a device for connecting the suspended part to the unsuspended part, which comprises in combination, a double acting dash pot secured to the unsuspended part, a cylinder secured to the unsuspended part, a piston in said cylinder, two sockets provided in said piston, a kingbolt rigidly secured to the suspended part and fitted in one of said sockets, and an arm fixed to the piston of the dashpot and having a spherical end fitted in the second socket.

7. In a vehicle including a suspended part and an unsuspended part, a device for connecting said suspended part to said unsuspended part, which comprises in combination, a member adapted to move transversely in the unsuspended part but positively connected thereto in the longitudinal direction, another member rigidly fixed to the suspended part, connecting means for positively coupling together said members in a horizontal and longitudinal direction while allowing relative displacements between them in other directions, and means for braking the transverse displacements of said parts with respect to each other.

8. In a vehicle including a suspended part and an unsuspended part, a device for connecting said suspended part to said unsuspended part, which comprises in combination, a member adapted to move transversely in the unsuspended part but positively connected thereto in the longitudinal direction, another member rigidly fixed to the suspended part, connecting means for positively coupling together said members in a horizontal and longitudinal direction while allowing relative displacements between them in other directions, means for braking the transverse displacements of said members with respect to each other, and means for braking the vertical displacements of the suspended part with respect to the unsuspended part.

9. In a vehicle including a suspended part and an unsuspended part, a device for connecting said suspended part to said unsuspended part, which comprises in combination, a member adapted to move transversely in the unsuspended part but positively connected thereto in the longitudinal direction, another member rigidly fixed to the suspended part, a cylinder carried by one of said members, a ball carried by the other member adapted to freely engage in said cylinder, and means for braking the transverse displacements of the first mentioned member with respect to the unsuspended part of the vehicle.

10. A device according to claim 8 in which the means for braking the vertical displacements of the suspended part with respect to the unsuspended part comprise in combination, a cylinder secured to the unsuspended part, a liquid filling said cylinder, a piston adapted to reciprocate in said cylinder, calibrated conduits provided with valves in said piston, a kingbolt rigidly secured to the suspended part, and a ball at the end of said kingbolt adapted to fit in a corresponding socket of the piston.

JEAN BUGATTI.